April 21, 1953 — J. ROSHEIM — 2,635,772
ENSILAGE UNLOADING AND SILO FILLING WAGON
Filed May 15, 1950 — 2 SHEETS—SHEET 1
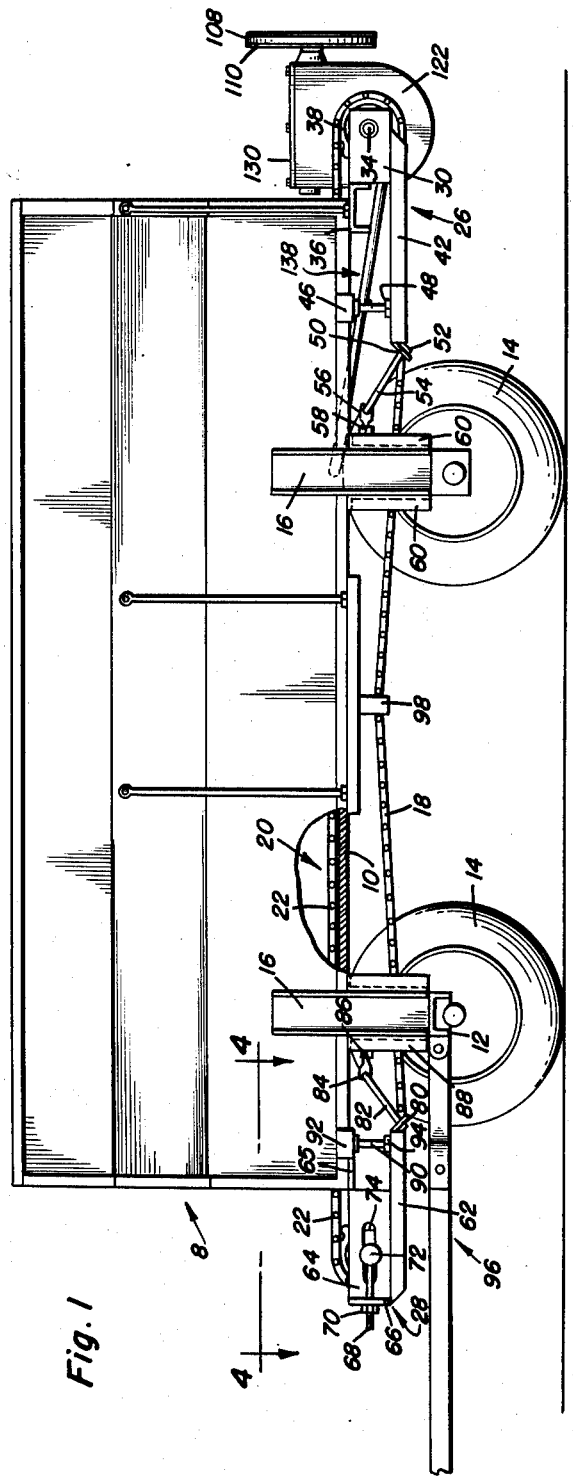
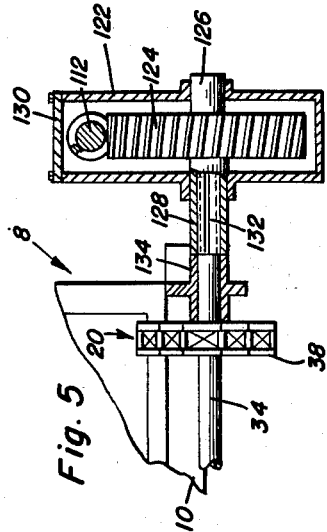
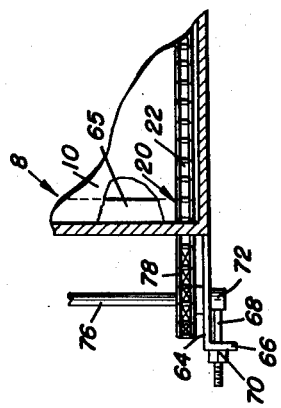
John Rosheim
INVENTOR.

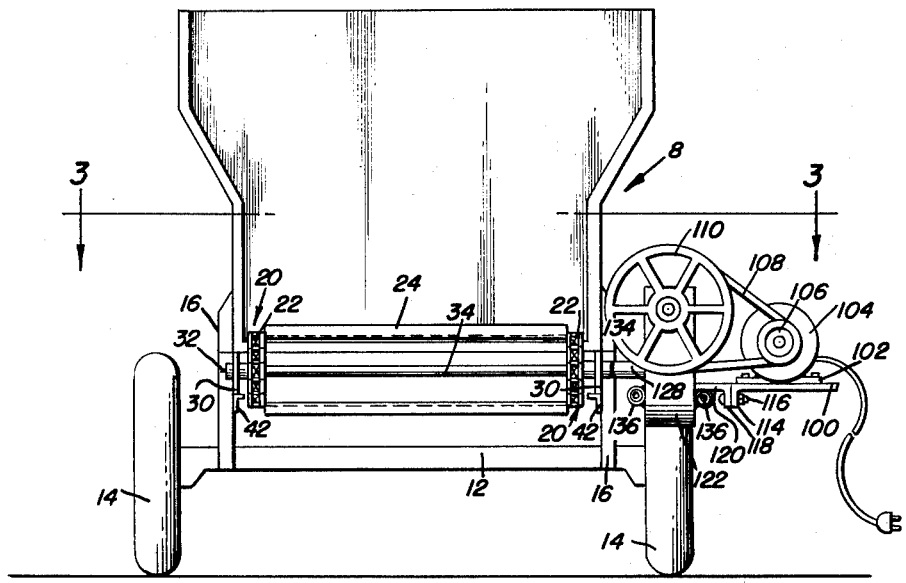

Patented Apr. 21, 1953

2,635,772

UNITED STATES PATENT OFFICE 2,635,772

ENSILAGE UNLOADING AND SILO FILLING WAGON

John Rosheim, Scarville, Iowa

Application May 15, 1950, Serial No. 162,058

2 Claims. (Cl. 214—83.36)

The present invention relates to certain new and useful improvements in a wagon which is especially, but not necessarily, adapted for transporting and unloading ensilage into a silo or similar container.

More specifically, the invention relates to a common type of farm wagon which is revised in construction and then provided with added equipment whereby it is thus rendered properly adaptable for conveniently and effectively discharging the load through the tail end of the wagon.

One phase of the invention has to do with means whereby the wagon body is elevated above the usual front and rear wheel supported bolster so that sufficient space is then available between the bottom of the body and bolster to accommodate and permit operation of the lower run of an endless chain-type conveyor.

Another object of the invention is to equip the forward and rear end portions of the wagon body with especially designed outstanding adapter devices having suitable bearings to accommodate transversely disposed front and rear shafts, said shafts being provided with sprocket wheels over which the sprocket chains are trained for properly controlled operation.

A further object of the invention is to provide a readily attachable and detachable power plant of a self-contained construction which may be mounted on and solely supported by one end portion of the rear shaft and wherein said power plant is of the utmost simplicity in construction, light in weight, substantial enough to deliver the power required to operate the endless conveyor and which is unique in that it is provided with an outstanding horizontally disposed brace or leg which is adapted to rest on an adjacent wagon wheel to stabilize the power plant and to prevent it from rotating through an orbital path when the electric motor is in operation.

Another and more general object is to provide novel conveyor means and power plant means in which manufacturers and users will find their expectant needs fully met, contained and satisfactorily available.

Other objects and advantages will become more readily apparent from the following description and the accompanying illustrative drawings.

In the accompanying drawings, wherein like numerals are employed to designate like parts throughout the views:

Figure 1 is a side elevational view with a portion broken away and shown in section disclosing an ensilage transporting and unloading wagon constructed in accordance with the principles of the present invention;

Figure 2 is a rear end elevation of the structure shown in Figure 1, that is, observing same in the direction from right to left;

Figure 3 is a fragmentary view, partly diagrammatic in nature, taken on the horizontal line 3—3 of Figure 2, looking in the direction of the arrows;

Figure 4 is a fragmentary section on the horizontal line 4—4 of Figure 1, looking in the direction of the arrows;

Figure 5 is a fragmentary sectional and elevational view showing the manner in which the portable power plant is separably coupled to the rear power take-off driven shaft of the conveyor means; and, Figure 6 is a fragmentary perspective view showing the essential parts of one of the adapter devices for the rear end portion of the wagon body, a device which supports and accommodates the rear driven shaft and corresponding ends of the conveyor chain.

The farm-type wagon body is denoted by the numeral 8 and is of a conventional construction. The bolsters on which the bottom 10 of the wagon body normally rests, ordinary constructions are denoted by the numeral 12 and these are provided with suitable ground engaging wheels 14. In order to elevate the bottom of the wagon body well above the bolsters 12 I provide suitable uprights 16 these being rigidly connected at their lower ends to the bolsters and secured at their upper ends to the sides of the wagon body. These uprights are sufficiently high to provide the clearance space between the bottom of the body and the bolsters 12, sufficient for unobstructed operation of the lower run 18 of the endless conveyor means 20. The upper run of the conveyor means rests on and is virtually "hung" upon the bottom 10 as shown at 22 in Figure 1. The conveyor comprises endless sprocket chains connected together by suitable scraping and unloading flights 24 as shown in Figure 3.

In order to utilize a conventional marketed type wagon body it is necessary to provide special attachments for the forward and rear end portions thereof. These attachments may best be referred to as adapter devices. I use a pair of duplicate adapter devices 26 on the rear end portion of the wagon body and a pair of similarly constructed outstanding adapter devices 28 on the forward end of the wagon body. Each adapter device 26 is of the construction shown in Figure 6 wherein it will be seen that a plate 30 is provided with a suitable bearing 32 for the rear driven or power take-off shaft 34. The plate is welded or otherwise connected to a transverse channel member 36 attached to the under side of the wagon body. The shaft is provided at opposite ends with sprocket wheels 38 to accommodate the sprocket chains 40. The plate 30 is rigidly secured to a horizontal angle iron 42 which partly underlies the bottom and projects also rearwardly beyond the body. A vertical brace 44 is rigidly attached at its upper end as at 46 to the wagon body and is secured by nuts or the like 48 to the angle iron. The inward end of the angle iron is provided with an apertured ear 50 to accommodate the headed end 52 of a diagonal stay rod 54 which is in turn secured to an anchoring bolt 56 adjustably connected at 58 to a cleat 60 secured to the adjacent elevating upright 16 as shown in Figure 1.

The two adapter devices at the opposite or forward end of the body, that is the ones denoted generally by the numerals 28, are quite similar in principal structural characteristics to the adapter devices 26 already described. In fact, most of the parts are duplicated in the pairs of devices 26 and 28 at opposite ends of the body. Perhaps, it is best to describe these devices separately and to use separate numerals and lead lines. To this end the numeral 62 (see Fig. 1) denotes a horizontal angle iron carrying an integrated vertical plate 64 fastened to an anchoring plate 65 carried by the wagon body. Plate 64 is provided with a lateral apertured ear or flange 66. The aperture in the flange accommodates the screw threaded end 68 of an adjusting bolt which is held in place by an adjusting nut 70 and is connected with a bearing 72 slidable in an adjusting slot 74 in said plate. As best shown in Figure 4 the bearing serves to accommodate the front driven shaft 76 provided with sprocket wheels 78 for the coacting sprocket chains. The rear end of angle iron 62 is provided with a down-bent lug or ear 80 to which the headed end of a diagonal stay rod 82 is connected. The rod is formed with a hook or otherwise constructed to anchor in an apertured head 84 on a bolt held in place at 86 on a cleat 88 attached to the forward elevating upright 16. Here again a brace 90 is provided and this is joined to a clip or the like 92 which in turn is fastened to the bottom of the wagon. The lower end of the brace 90 is secured by a nut or the like 94 to the angle iron 62. All of these parts coordinate to fasten the adapter device 28 adjustably and properly on the wagon and to provide suitable bearing means for one end portion of the front cross-shaft 76. The numeral 96 designates a draft tongue. Then, and as shown in Figure 1, the numeral 98 designates one of a pair of oppositely disposed guide clips to assist in suspending the lower runs of the sprocket chains.

From the description so far given it will be seen that novelty is predicated on the provision of similarly constructed adapter fixtures or devices which are used in pairs and denoted by the numerals 26 (Fig. 6) and 28 (Fig. 1), these devices being adjustably secured to forward and rearward end portions of the wagon body so as to position the forward and rearward shafts 76 and 34 across the ends of the bottom of the wagon in somewhat spaced parallelism. With these devices thus installed the endless chain conveyor means is applicable to the bottom of the wagon body with the sprocket chains trained over the sprocket wheels on the two shafts 34 and 76. The chains may be adjusted and thus tautened and the lower runs may be partly suspended by suitable guides 98 to facilitate proper running of the chains in relation to the bottom of the wagon. Actually the bottom of the wagon serves as means for supporting and partially hanging the conveyor means. The provision of the special adapter devices makes it possible to take an ordinary farm wagon and convert it into one which has facilities for not only containing and transporting silage but also unloading it in a practical and convenient manner. It is also a matter of significance that by using uprights 16—16 in proper pairs on opposite sides of the wagon body and supporting the wagon body in vertically spaced relation above the bolsters sufficient space is had between the bottom of the wagon body in the bolsters to accommodate the conveyor or chains.

An equally significant phase of the invention has to do with the readily applicable and removable power plant. The power plant is characterized by a sectional base which includes a motor shelf 100 (see Fig. 2) to which the base 102 of the electric motor 104 is connected. The shaft of the motor is provided with a pulley 106 to accommodate a friction driving belt 108 which is trained over a larger speed reducing pulley 110 rigidly carried by one end of a worm shaft 112 (see Fig. 5). The shelf 100 has a depending flange 114 which is bolted at 116 to a similar flange 118 on a complemental section or shelf 120 of the base. The latter section 120 supports a gear box or casing 122 for the gearing, that is the worm shaft 112 and also the worm gear 124. The worm gear is provided with a solid shaft 126 (see Fig. 5) on one side which is journaled in a suitable bearing and is provided on the opposite side with a hollow drive shaft 128 also journaled in an appropriate bearing. A removable cover 130 is provided on the gear casing. The motor, gear casing and base means all coordinate into a unitary assemblage which is readily attachable and detachable. To accomplish this the hollow drive shaft 128 is especially made to coordinate with the end extension 132 on the rear driven shaft 34 of the wagon. An appropriate wagon 134 is provided and the shafts 128 and 132 may be telescopically splined or otherwise keyed together for simultaneous rotation.

The gear casing 122 is provided on opposite sides with spaced parallel socket members 136 which serve as holders or retainers for the parallel limbs of a U-shaped stabilizing leg 138 as best shown in Fig. 3. This leg is drawn on a horizontal plane and is rigidly joined to the base of said power plant and the bight portion of the leg rests on the tire of the adjacent wagon wheel 14. Virtually all of the weight of the power plant is supported on the shaft end 132 by way of a hollow keyed driving shaft 138. However it is necessary to provide some means to prevent the tendency of the power plant to revolve around its own axis, that is to turn in an orbital path. The leg 138 resting on the tire 14 accomplishes this end and in addition the leg has a tendency to partially support some of the weight of the power plant. I am especially interested in a simple and practical readily applicable and removable power plant which when not in use may be stored in a suitcase and conveniently carried about and which when in use will supply sufficient power to the driven shaft 34 to operate conveyor means on a wagon of the type shown.

In taking into account the following claims it will be seen that I am interested in conveyor means and adapter devices as such forming an assemblage which is applicable to a flat bottomed farm wagon body to transform same into a suitable unloader for loose materials. Novelty is also predicated upon the wheel supported bolsters and elevating means between the bolsters and the wagon body and the conveyor means mounted on the bottom of the body with the lower flight of the conveyor chains operating in the space between the bottom of the body and the underlying wheel supported bolsters. More importantly, however, I am interested in the readily applicable and removable motor included power plant, a simple device which may be readily applied and removed and which will serve to supply requisite motion to the conveyor means.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. An ensilage loading and silo filling conveyance of the class shown and described comprising a wheeled wagon body having a flat bottom, shafts mounted for rotation at opposite ends of said body, conveyor means connected with said shafts and operable along the bottom primarily within the confines of said body, and a readily attachable and detachable power plant embodying detachable shelf means, a motor removably mounted on said shelf means, a gear box, gearing mounted for operation in said gear box including a drive shaft detachably connected with one end of one of the aforesaid shafts, an operating connection between said drive shaft and said one shaft, and a U-shaped stabilizing leg mounted on said gear box and extending beyond an adjacent marginal portion of said shelf means, said leg being in a horizontal plane coplanar with said shelf means and adapted to rest in the manner of a prop upon an adjacent wheel on said wagon body.

2. A portable power plant for delivering motion to a conveyor power take-off shaft comprising a shelf-like base, an electric motor detachably mounted on said base, a gear casing also detachably mounted on said base, a worm gear mounted for rotation in said casing and provided with a hollow shaft projecting beyond an adjacent wall of the casing and adapted to be coupled with a splined end on a conveyor power receptive and take-off shaft, a worm-equipped shaft also mounted in said casing with the worm thereon in mesh with said gear, a pulley fixed on said motor shaft, a speed reducing larger pulley fixedly mounted on said worm shaft, a belt trained over said pulleys for operating same, and a U-shaped leg carried by said gear casing and extending at right angles therefrom and adapted to rest on a relatively fixed support.

JOHN ROSHEIM.

References Cited in the file of this patent
UNITED STATES PATENTS

| Number | Name | Date |
|---|---|---|
| 2,478,583 | Hybbert | Aug. 9, 1949 |
| 2,482,014 | Maurits | Sept. 13, 1949 |
| 2,482,028 | Reinking | Sept. 13, 1949 |
| 2,488,217 | McCall | Nov. 15, 1949 |
| 2,489,055 | Steinacher | Nov. 22, 1949 |
| 2,496,305 | Ortmeier | Feb. 7, 1950 |
| 2,537,381 | Turner et al. | Jan. 9, 1951 |
| 2,552,953 | Gaddis | May 15, 1951 |
| 2,595,395 | Lavelle et al. | May 6, 1952 |